(12) United States Patent  
Crump et al.

(10) Patent No.: US 10,208,838 B2
(45) Date of Patent: Feb. 19, 2019

(54) VORTEX CHANNEL

(71) Applicant: BorgWarner Inc., Auburn Hills, MI (US)

(72) Inventors: Matthew W. Crump, Cortland, NY (US); Keith B. Cobb, Cortland, NY (US)

(73) Assignee: BorgWarner Inc., Auburn Hills, MI (US)

(*) Notice: Subject to any disclaimer, the term of this patent is extended or adjusted under 35 U.S.C. 154(b) by 96 days.

(21) Appl. No.: 15/520,465

(22) PCT Filed: Oct. 14, 2015

(86) PCT No.: PCT/US2015/055422
§ 371 (c)(1),
(2) Date: Apr. 20, 2017

(87) PCT Pub. No.: WO2016/069261
PCT Pub. Date: May 6, 2016

(65) Prior Publication Data
US 2017/0314651 A1 Nov. 2, 2017

Related U.S. Application Data

(60) Provisional application No. 62/072,158, filed on Oct. 29, 2014.

(51) Int. Cl.
F16H 7/22 (2006.01)
F16H 7/08 (2006.01)
(Continued)

(52) U.S. Cl.
CPC ............... F16H 7/08 (2013.01); F16H 7/12 (2013.01); F16K 15/00 (2013.01); F01L 1/022 (2013.01);
(Continued)

(58) Field of Classification Search
CPC ..... F16H 2007/0806; F16H 2007/0859; F16H 2007/0812; F16H 7/0848; F16H 2007/0891
(Continued)

(56) References Cited

U.S. PATENT DOCUMENTS 3,960,026 A * 6/1976 Hibino .................. F16H 7/12 474/110
4,543,079 A * 9/1985 Matsuda ............ F16H 7/0836 474/110
(Continued)

FOREIGN PATENT DOCUMENTS

EP 1411271 A2 4/2004

OTHER PUBLICATIONS

International Search Report and Written Opinion; dated Jan. 7, 2016; for International Application No. PCT/US2015/055422; 16 pages.

Primary Examiner — Henry Y Liu
(74) Attorney, Agent, or Firm — BrooksGroup

(57) ABSTRACT

A product for applying tension is disclosed. The product may include a block with a first bore opening into to the block. A body may be provided having a second bore substantially larger in diameter than the first bore. The body may be positioned against the block so that the first bore is open to the second bore. The body may have a passage for providing fluid to a pressure chamber from the second bore. The passage may be arranged to open to the second bore and form a tangent to the second bore. Fluid may flow from the first bore to the pressure chamber through the second bore and the passage substantially unimpeded. Fluid flow is impeded from the passage to the first bore as a result of the configuration of the first bore, second bore and passage.

20 Claims, 3 Drawing Sheets

(51) Int. Cl.
  *F16H 7/12* (2006.01)
  *F16K 15/00* (2006.01)
  *F01L 1/02* (2006.01)
(52) U.S. Cl.
  CPC .... *F16H 7/0848* (2013.01); *F16H 2007/0806* (2013.01); *F16H 2007/0812* (2013.01); *F16H 2007/0859* (2013.01); *F16H 2007/0872* (2013.01); *F16H 2007/0891* (2013.01)
(58) Field of Classification Search
  USPC ......................................................... 474/110
  See application file for complete search history.

(56) References Cited

U.S. PATENT DOCUMENTS

| | | | | |
|---|---|---|---|---|
| 4,963,121 | A * | 10/1990 | Himura | F16H 7/08 474/110 |
| 5,090,946 | A * | 2/1992 | Futami | F16H 7/08 474/104 |
| 5,193,498 | A * | 3/1993 | Futami | F01L 1/02 123/90.31 |
| 5,277,664 | A * | 1/1994 | Mott | F16H 7/0848 474/110 |
| 5,346,436 | A * | 9/1994 | Hunter | F16H 7/0848 474/110 |
| 5,352,159 | A * | 10/1994 | Suzuki | F16H 7/08 474/110 |
| 5,441,457 | A * | 8/1995 | Tsutsumi | F16H 7/08 474/110 |
| 5,512,019 | A * | 4/1996 | Shimaya | F16H 7/08 474/110 |
| 5,577,970 | A * | 11/1996 | Smith | F16H 7/0848 474/110 |
| 5,797,817 | A * | 8/1998 | Senftleben | F01L 1/02 474/110 |
| 5,868,638 | A * | 2/1999 | Inoue | F16H 7/0848 474/101 |
| 5,935,031 | A * | 8/1999 | Tada | F15B 21/044 474/101 |
| 5,954,159 | A * | 9/1999 | Nakamura | F01L 1/02 184/11.2 |
| 5,967,920 | A * | 10/1999 | Dembosky | F01L 1/02 474/109 |
| 5,967,921 | A * | 10/1999 | Simpson | F16H 7/08 474/110 |
| 6,196,939 | B1 * | 3/2001 | Simpson | F16H 7/0848 474/101 |
| 6,352,487 | B1 * | 3/2002 | Tada | F01L 1/02 474/110 |
| 6,358,168 | B1 * | 3/2002 | Tada | F16H 7/08 474/101 |
| 6,435,993 | B1 * | 8/2002 | Tada | F16H 7/0836 474/109 |
| 6,810,907 | B2 * | 11/2004 | Hashimoto | F16H 7/0848 137/514.5 |
| 6,866,601 | B2 * | 3/2005 | Saitoh | F16H 7/0836 474/109 |
| 6,875,141 | B2 * | 4/2005 | Konishi | F16H 7/0836 474/101 |
| 6,945,889 | B2 * | 9/2005 | Markley | F16H 7/0848 474/109 |
| 7,540,816 | B2 * | 6/2009 | Yoshida | F16H 7/0848 474/110 |
| 7,691,017 | B2 * | 4/2010 | Seungpyo | F16H 7/0836 267/155 |
| 7,775,921 | B2 * | 8/2010 | Izutsu | F16H 7/0848 474/109 |
| 7,918,754 | B2 * | 4/2011 | Kurematsu | F16H 7/0848 474/110 |
| 8,202,184 | B2 * | 6/2012 | Koch | F16H 7/0848 184/15.1 |
| 8,403,783 | B2 * | 3/2013 | Wigsten | F16H 7/0848 474/109 |
| 8,523,720 | B2 * | 9/2013 | Reinhart | F16H 7/0848 29/525.01 |
| 8,951,154 | B2 * | 2/2015 | Konuma | F16H 7/0848 474/110 |
| 9,618,096 | B2 * | 4/2017 | Markley | F16H 7/08 |
| 9,915,323 | B2 * | 3/2018 | Yoshida | F16H 7/08 |
| 10,024,401 | B2 * | 7/2018 | Kurematsu | F16H 7/08 |
| 2012/0135831 | A1 * | 5/2012 | Perissinotto | F16H 7/0836 474/110 |
| 2012/0322596 | A1 * | 12/2012 | Hofmann | F16H 7/0848 474/110 |
| 2013/0178317 | A1 * | 7/2013 | Perissinotto | F16H 7/0836 474/110 |
| 2013/0331214 | A1 * | 12/2013 | Crump | F16H 7/0848 474/110 |

* cited by examiner

VORTEX CHANNEL

CROSS-REFERENCE TO RELATED APPLICATIONS

This application claims the benefit of U.S. Provisional Application No. 62/072,158 filed Oct. 29, 2014.

TECHNICAL FIELD

The field to which the disclosure generally relates includes valves and more particularly, to check valves that allow free flow in one direction and impede flow in the other direction.

BACKGROUND

Hydraulic automatic tensioners use pressure to remove slack and dampen vibrations such as those occurring in an engine's timing chain or belt as it moves between adjacent sprockets or pulleys. Timing chain tension may be automatically adjusted to engine speed and vibration generation by the flow of hydraulic fluid into, and out of, the tensioner.

SUMMARY OF ILLUSTRATIVE VARIATIONS

A product for applying tension according to a number of variations may include a block with a first bore opening into the block. A body may have a second bore that may be substantially larger in diameter than the first bore. The body may be positioned against the block so that the first bore is open to the second bore, and may have a passage for providing fluid from the second bore to a pressure chamber. The passage may be arranged to open into the second bore forming a tangent to the second bore. Fluid may flow from the first bore to the pressure chamber through the second bore and the passage, substantially unimpeded. Fluid flow may be impeded from the passage to the first bore as a result of the configuration of the first bore, second bore and passage.

According to a number of other variations a product for applying tension may include a body connected to a block. The body may have a main bore with a piston slidably disposed therein. The piston may have a first end that extends out of the main bore and a second end disposed in the main bore. A first chamber may be defined in the main bore adjacent the second end of the piston. A first cross bore may be provided in the body opening to the first chamber. A second cross bore may be provided in the body and may have an axis. The second cross bore may be substantially larger than the first cross bore, and may be spaced apart from, and parallel to, the first bore. A first passage may extend through the body between the first and second cross bores forming a tangent to the second cross bore. A second passage may be provided in the block, opening to, and coaxial with, the second cross bore. The second passage may also open to a pressurized fluid chamber in the block. Pressurized fluid from the pressurized fluid chamber may enter the first chamber through a path that includes the second passage, the second cross bore, the first passage and the first cross bore, as the piston moves out of the first cross bore. A force on the piston toward the body may cause fluid to flow from the first chamber through the first cross bore, the first passage, the second cross bore, and the second passage to the pressurized fluid chamber.

According to a number of other variations a hydraulic tensioner for applying force to a component of an engine may be provided. A body of the tensioner may have a piston bore with a cylindrical shape having a first diameter. The body may have a main chamber with a cylindrical shape having a second diameter. A piston may be slidably disposed in the piston bore defining a first chamber in the bore between the body and the piston. A first passage may be provided in the body extending between the piston bore and the main chamber. At least part of the first passage may form a tangent to the main chamber. A second passage may be provided in the engine that opens to the main chamber. The second passage may be coaxial with the main chamber.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
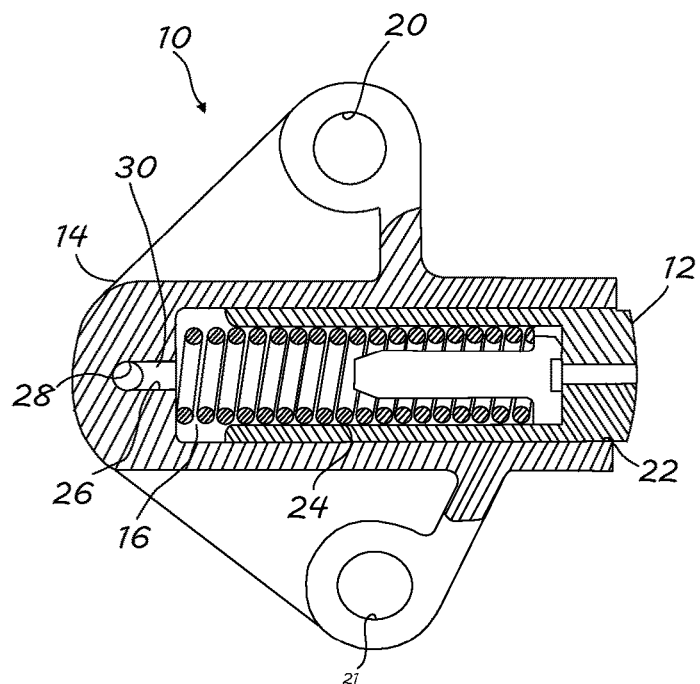
FIG. 1 is a partial cross sectional view of a hydraulic tensioner according to a number of variations.

In an internal combustion engine a linking element such as a chain or belt may play a part in synchronizing the action of the various valves. To maintain the desired tension on the linking element, a hydraulic tensioner 10 as illustrated in FIG. 1 may be used. A tensioner guide (not illustrated), may be provided, upon which the linking element slides and which may be forced toward the linking element to remove slack by applying tension as a result of a force applied by a piston 12 of the tensioner 10.

A housing or body 14 of the tensioner 10 may be provided with mounting holes 20 and 21 to fix the tensioner to an engine. A bore 22 may be provided in the body which may have a cylindrical shape to simplify formation with a diameter sized to slidably hold the piston 12. With the piston 12 positioned in the bore 22, a chamber 16 is defined between the body 14 and the piston 12 which may be a pressure chamber to contain hydraulic fluid under pressure. Pressure in the chamber 16 may act to force the piston 12 out of the body 14, and with the body fixed to the associated engine, to apply force to a tensioner guide and a linking element. In addition, a spring 24 is positioned in the bore 22 and biases the piston 12 out of the body 14.

Another bore 26 may be provided at the end of the bore 22 and may be smaller in diameter than the bore 22. The bore 26 may be intersected by a cross bore 28 and together they may form a passage 30 through the body that may be connected to a pressurized fluid supply as will be described later. In response to movement, vibration or slack in the linking element that reduces force on the piston 12, the spring 24 forces the piston 12 out of the body 14 and along with pressure from the fluid supply draws fluid into the chamber 16. To maintain the desired amount of tension on the linking element, the supply of fluid into and through the passage 30 is substantially unrestricted. When tension in the linking element increases, increased force against the piston 12 results, and the piston 12 tends to retract into the body 14. Fluid in the chamber 16 resists retraction of the piston 12. To inhibit excessive retraction and to maintain the desired tension, flow through the passage 30 may be restricted or impeded as will be described in relation to FIG. 2.

Figure 2:
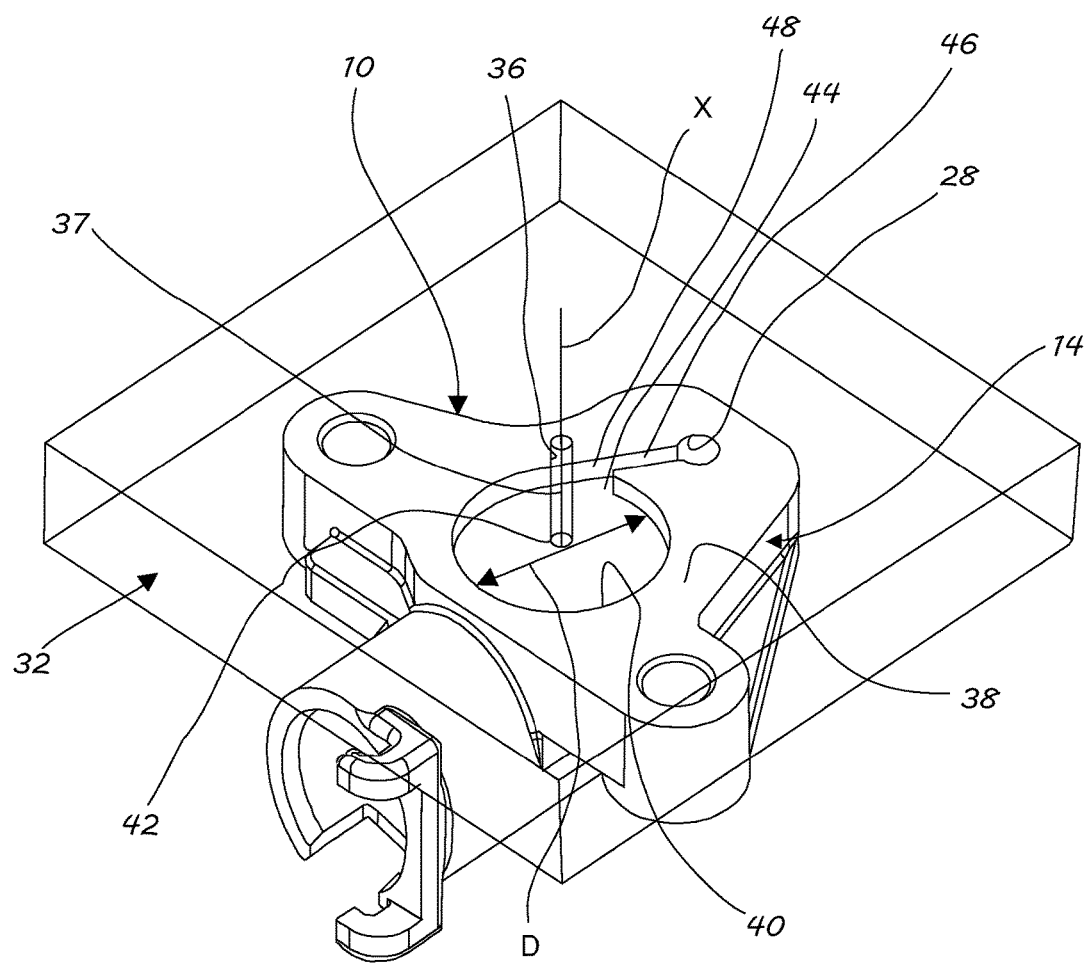
FIG. 2 is a schematic isometric view of a hydraulic tensioner positioned against an engine block according to a number of variations.

Referring to FIG. 2, a hydraulic tensioner 10 is positioned against a section of engine 32. The engine 32 may include a bore 36 extending between a supply of pressurized fluid in the engine and opening into the hydraulic tensioner 10 to provide a passage 37 for the transmission of fluid and fluid pressure. In communication with the bore 36 another bore is presented through that surface 38 of tensioner 10 that is positioned against the engine 32. This other bore defines a main chamber 40 in the shape of a cylindrical section having a diameter D, a perpendicular axis x, and a height h in the direction of axis x. The bore 36 is positioned coaxially with the main chamber 40 about the axis x and has a diameter that is substantially smaller than D. The main chamber 40 is closed except for first and second ports 42 and 44. The first port 42 is provided at the opening of the bore 36 into the main chamber 40 and is an axial port, since the main chamber 40 and the passage 37 have the same axis. The second port 44 is provided at the opening of the passage 46 to the main chamber 40 and is a tangential port. The passage 46 provided in the body 14 between the main chamber 40 and the second bore 28, forms at least part of the passage 30 to the pressure chamber 16 (shown in FIG. 1). The wall 48 of the body 14 defines the edge of the passage 46 and is configured to form a tangent to the cylindrical section formed by the main chamber 40, thereby defining the tangential port 44.

Figure 3:
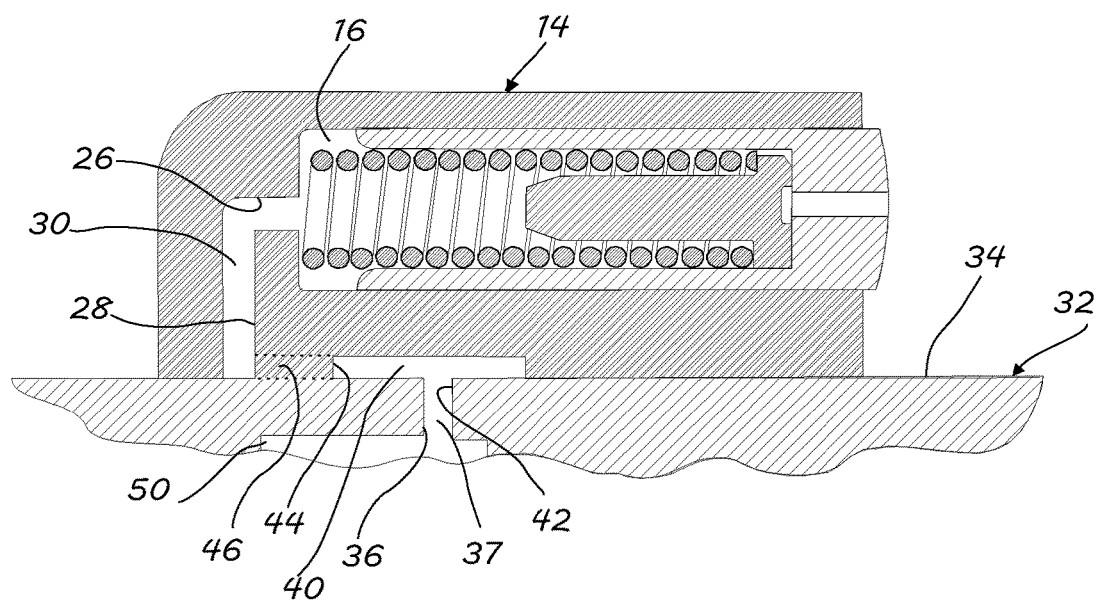
FIG. 3 is a partial cross sectional view of a hydraulic tensioner positioned against an engine block according to a number of variations.

Referring to FIG. 3, the fluid route between the pressurized fluid supply chamber 50 in the block 34 of the engine 32 and the pressure chamber 16, is visible. The passage 30 in the body 14 includes the bore 26 and the bore 28 and extends between the pressure chamber 16 and the passage 46. The passage 46 in the body 14 extends between the bore 28 and the main chamber 40 opening thereto at the tangential port 44. The main chamber 40 is open through the axial port 42 and the passage 37 provided by the bore 36 to the pressurized fluid supply chamber 50. Fluid and fluid pressure may be communicated from the pressurized fluid supply chamber 50 to the pressure chamber 16 through the passage 37 (bore 36), the axial port 42, the main chamber 40, the tangential port 44, the passage 46 and the passage 30 (bores 28, 26). Fluid and fluid pressure may be communicated from the pressure chamber 16 to the pressurized fluid supply chamber 50 through the passage 30 (bores 26, 28), the passage 46, the tangential port 44, the main chamber 40, the axial port 42 and the passage 37 (bore 36).

Figure 4:
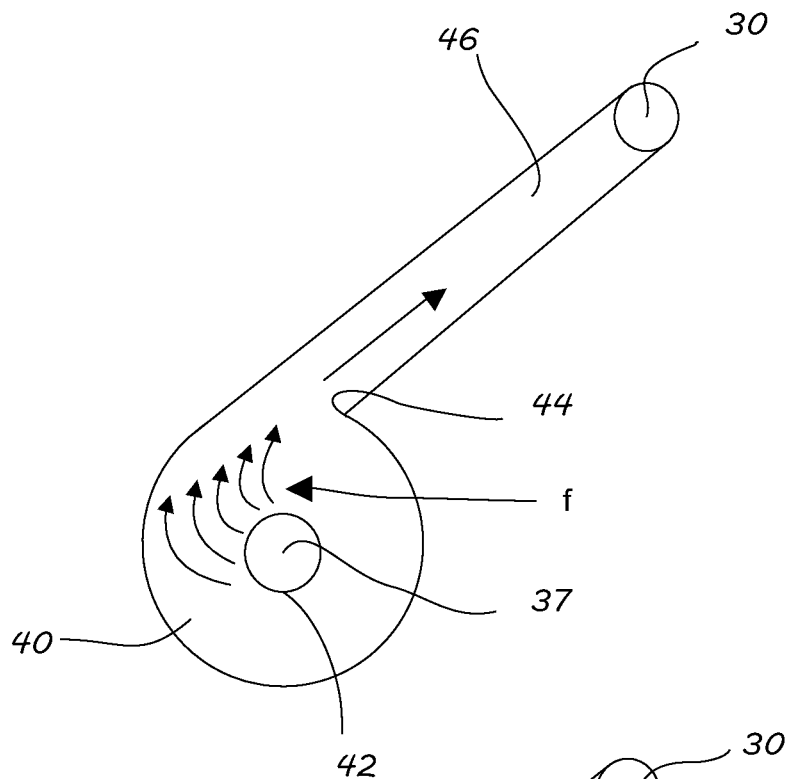
FIG. 4 is a schematic representation of part of a flow path of a hydraulic tensioner according to a number of variations.
Figure 5:
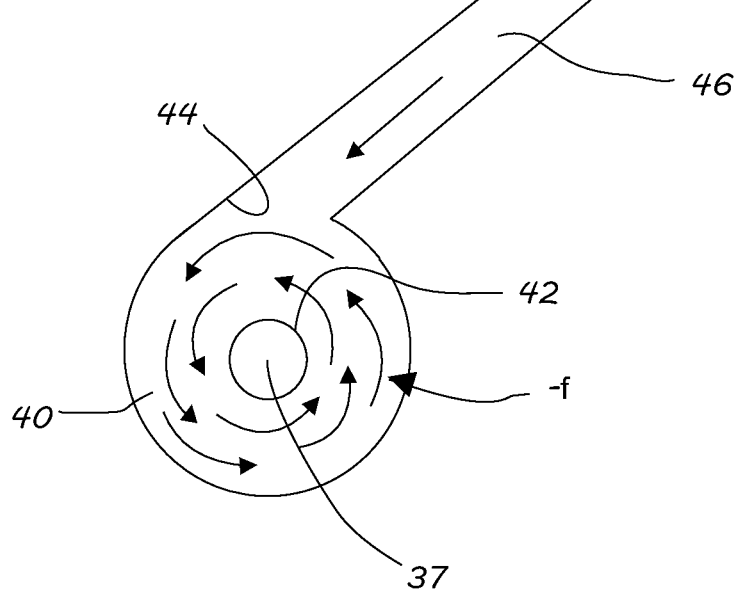
FIG. 5 is a schematic representation of part of a flow path of a hydraulic tensioner according to a number of variations.

The communication or flow of fluid and fluid pressure through the main chamber 40 is substantially unimpeded in the forward direction from the pressurized fluid supply chamber 50 to the pressure chamber 16. This is due to the configuration of the passage 37 with its axial port 42, the main chamber 40, and the passage 46 with its tangential port 44. Flow and pressure is impeded in the reverse direction from the pressure chamber 16 to the pressurized fluid supply chamber 50. This is due to the configuration of the passage 46 with its tangential port 44, the main chamber 40, and the passage 37 with its axial port 42. More specifically, as depicted in FIG. 4, forward flow f, entering the main chamber 40 from the passage 37 at the axial port 42 moves relatively freely in the direction of the tangential port 44 and there through into the passage 46. As depicted in FIG. 5, reverse flow –f, entering the main chamber 40 from the passage 46 through the tangential port 44 is directed by the edge of the main chamber 40 to form a vortex impeding flow out through the axial port 42. Through this structure, the communication of fluid and fluid pressure is provided from the pressurized fluid supply chamber 50 to the pressure chamber 16 substantially unimpeded and the communication of fluid and fluid pressure is impeded from the pressure chamber 16 to the pressurized fluid supply chamber 50 without the use of mechanical check valves or other moveable elements. Without moving parts, construction is simplified and the wear and fatigue of moving parts may be avoided.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include product for applying tension having a block with a first bore opening into the block. A body may have a second bore that may be substantially larger in diameter than the first bore. The body may be positioned against the block so that the first bore is open to the second bore, and may have a passage for providing fluid from the second bore to a pressure chamber. The passage may be arranged to open into the second bore forming a tangent to the second bore. Fluid may flow from the first bore to the pressure chamber through the second bore and the passage substantially unimpeded. Fluid flow may be impeded from the passage to the first bore as a result of the configuration of the first bore, second bore and passage.

Variation 2 may include a product according to variation 1 with a piston slidably disposed in the body. The pressure chamber may be formed between the body and the piston so that fluid supplied from the first bore enters the pressure chamber as the piston slides out of the body.

Variation 3 may include a product according to variation 1 or 2 where a third bore in the body forms part of the passage and wherein the third bore is parallel to both the first bore and the second bore and opens to the pressure chamber.

Variation 4 may include a product according to variation 3 with a fluid chamber in the block, and wherein the first bore opens to the fluid chamber.

Variation 5 may include a product according to variation 4 wherein the fluid chamber is continuously open to the pressure chamber for the communication of fluid pressure in both directions with no moveable mechanical element positioned to interrupt fluid flow.

Variation 6 may include a product for applying tension and may include a body connected to a block. The body may have a main bore with a piston slidably disposed in the main bore. The piston may have a first end that extends out of the main bore and a second end disposed in the main bore. A first chamber may be defined in the main bore adjacent the second end of the piston. A first cross bore in the body may open to the first chamber and a second cross bore in the body has an axis and may be substantially larger than the first cross bore. The second cross bore may be spaced apart from and parallel to the first bore. A first passage may extend through the body between the first and second cross bores and form a tangent to the second cross bore. A second passage may be provided in the block, opening to and coaxial with the second cross bore. The second passage may also open to a pressurized fluid chamber in the block. Pressurized fluid from the pressurized fluid chamber may enter the first chamber through a path that includes the second passage, the second cross bore, the first passage and the first cross bore, as the piston moves out of the first cross bore. A force on the piston toward the body may cause fluid to flow from the first chamber through the first cross bore, the first passage, the second cross bore, and the second passage to the pressurized fluid chamber.

Variation 7 may include a product according to variation 6 wherein flow from the second passage flows into the second cross bore and flows out of the second cross bore into the first passage substantially unimpeded.

Variation 8 may include a product according to variation 6 or 7 wherein flow from the first chamber flows out of the first cross bore into the first passage and out of the first passage into the second cross bore and out of the second cross bore into the second passage. Flow is impeded from entering the second passage by the configuration of the first passage, second cross bore and second passage.

Variation 9 may include a product according to any of variations 6-8 wherein the pressurized fluid chamber is in continuous open fluid communication with the first chamber in both directions with no movable mechanical obstruction.

Variation 10 may include a hydraulic tensioner for applying force to a component of an engine may be provided. A body of the tensioner may have a piston bore with a cylindrical shape having a first diameter. The body may have a main chamber with a cylindrical shape having a second diameter. A piston may be slidably disposed in the piston bore defining a first chamber in the bore between the body and the piston. A first passage may be provided in the body extending between the piston bore and the main chamber. At least part of the first passage may form a tangent to the main chamber. A second passage may be provided in the engine opening to the main chamber. The second passage may be coaxial with the main chamber.

Variation 11 may include a hydraulic tensioner according to variation 10 wherein the second passage has a third diameter and the second diameter of the main chamber is substantially larger than the third diameter.

Variation 12 may include a hydraulic tensioner according to variation 10 or 11 wherein the first pressure chamber is in continuous open fluid communication with the second passage in both directions with no movable obstruction.

Variation 13 may include a hydraulic tensioner according to any of variations 10-12 wherein the second passage may open to a fluid chamber in the engine having a pressurized fluid supply. Pressurized fluid may enter the hydraulic tensioner through a flow path that includes the second passage, main chamber, first passage, and first chamber, to apply fluid pressure to the piston.

Variation 14 may include a hydraulic tensioner according to any of variations 10-13 wherein flow from the fluid chamber to the first chamber is substantially unimpeded.

Variation 15 may include a hydraulic tensioner according to any of variations 13-14 wherein flow from the first chamber to the fluid chamber in response to a force on the piston is impeded by the configuration of the first passage, main chamber and second passage.

Variation 16 may include a hydraulic tensioner according to any of variations 13-15 wherein the component is a linking element and wherein the third diameter is selectively sized relative to the second diameter to allow flow into the second passage from the main chamber at a rate that relieves hydraulic tensioner pressure caused by engine load on the linking element.

Variation 17 may include a hydraulic tensioner according to variation 16 wherein slack in the linking element may be taken up by the piston extending from the piston bore in response to fluid pressure from the fluid chamber wherein the fluid pressure maintains tension on the linking element through the piston.

Variation 18 may include a hydraulic tensioner according to any of variations 13-17 wherein fluid pressure from the fluid chamber to the first chamber is substantially maintained.

Variation 19 may include a hydraulic tensioner according to any of variations 13-18 wherein hydraulic tensioner pressure caused by engine load on the linking element causes hydraulic pressure in the first chamber to be substantially higher than hydraulic pressure in the fluid chamber.

Variation 20 may include a hydraulic tensioner according to any of variations 13-19 wherein when fluid flows from the fluid chamber to the first chamber, flow through the main chamber proceeds substantially directly from the second passage to the first passage and when fluid flows from the first chamber to the fluid chamber flow through the main chamber proceeds from the first passage around the main chamber in a vortex and then toward the center of the main chamber to the second passage.

The above description of select variations within the scope of the invention is merely illustrative in nature and, thus, variations or variants thereof are not to be regarded as a departure from the spirit and scope of the invention.

What is claimed is:

1. A product for applying tension comprising: a block with a first bore opening into the block; a body having a second bore that is substantially larger in diameter than the first bore, the body positioned against the block so that the first bore is open to the second bore; the body having a passage for providing fluid from the second bore to a pressure chamber, wherein the passage is arranged to open to the second bore and form a tangent to the second bore; wherein fluid flows from the first bore to the pressure chamber through the second bore and the passage substantially unimpeded and fluid flow is impeded from the passage to the first bore as a result of the configuration of the first bore, the second bore and the passage.

2. The product according to claim 1 further comprising a piston slidably disposed in the body wherein the pressure chamber is formed between the body and the piston so that fluid supplied from the first bore enters the pressure chamber as the piston slides out of the body.

3. The product according to claim 2 further comprising a third bore in the body that forms part of the passage wherein the third bore is parallel to both the first bore and the second bore and opens to the pressure chamber.

4. The product according to claim 3 further comprising a fluid chamber in the block wherein the first bore opens to the fluid chamber.

5. The product according to claim 4 wherein the fluid chamber is continuously open to the pressure chamber for the communication of fluid pressure in both directions with no moveable mechanical element positioned to interrupt fluid flow.

6. A product for applying tension comprising: a body connected to a block, the body having a main bore; a piston slidably disposed in the main bore, the piston having a first end that extends out of the main bore and having a second end disposed in the main bore; a first chamber in the main bore adjacent the second end of the piston; a first cross bore in the body opening to the first chamber; a second cross bore in the body, the second cross bore having an axis, and the second cross bore substantially larger than the first cross bore, and the second cross bore being spaced apart from and parallel to the first bore; a first passage extending through the body between the first and second cross bores, the first passage forming a tangent to the second cross bore; and, a second passage in the block opening to, and coaxial with, the second cross bore, and the second passage opening to a pressurized fluid chamber in the block; wherein pressurized fluid from the pressurized fluid chamber enters the first chamber through a path including the second passage, the second cross bore, the first passage and the first cross bore, as the piston moves out of the first cross bore; wherein a force on the piston causes fluid to flow from the first chamber through the first cross bore, the first passage, the second cross bore, and the second passage to the pressurized fluid chamber.

7. The product according to claim 6 wherein fluid from the second passage flows into the second cross bore and flows out of the second cross bore into the first passage substantially unimpeded.

8. The product according to claim 7 wherein fluid from the first chamber flows out of the first cross bore into the first passage and out of the first passage into the second cross bore and out of the second cross bore into the second passage and flow is impeded from entering the second passage by the configuration of the first passage, the second cross bore and the second passage.

9. The product according to claim 6 wherein the pressurized fluid chamber is in continuous open fluid communication with the first chamber in both directions with no movable mechanical obstruction.

10. A hydraulic tensioner for applying force to a component of an engine comprising: a body having a piston bore with a cylindrical shape, the piston bore having a first diameter, and the body having a main chamber with a cylindrical shape, the main chamber having a second diameter; a piston slidably disposed in the piston bore defining a first chamber in the piston bore between the body and the piston; a first passage in the body extending between the piston bore and the main chamber, at least part of the first passage forming a tangent to the main chamber; and a second passage in the engine opening to the main chamber, the second passage being coaxial with the main chamber.

11. The hydraulic tensioner according to claim 10 wherein the second passage has a third diameter and the second diameter of the main chamber is substantially larger than the third diameter.

12. The hydraulic tensioner according to claim 10 wherein the first pressure chamber is in continuous open fluid communication with the second passage in both directions with no movable obstruction.

13. The hydraulic tensioner according to claim 11 wherein the second passage opens to a fluid chamber in the engine having a pressurized fluid supply, wherein pressurized fluid enters the hydraulic tensioner through a flow path including the second passage, the main chamber, the first passage, and the first chamber to apply fluid pressure to the piston.

14. The hydraulic tensioner according to claim 13 wherein flow from the fluid chamber to the first chamber is substantially unimpeded.

15. The hydraulic tensioner according to claim 14 wherein flow from the first chamber to the fluid chamber in response to a force on the piston is impeded by the configuration of the first passage, the main chamber and the second passage.

16. The hydraulic tensioner according to claim 15 wherein the component of the engine is a linking element and wherein the third diameter is selectively sized relative to the second diameter to allow flow into the second passage from the main chamber at a rate that relieves hydraulic tensioner pressure caused by engine load on the linking element.

17. The hydraulic tensioner according to claim 16 wherein slack in the linking element is taken up by the piston extending from the piston bore in response to a spring, wherein fluid pressure in the piston bore maintains tension on the chain through the piston.

18. The hydraulic tensioner according to claim 17 wherein fluid pressure is substantially maintained when communicated from the fluid chamber to the first chamber.

19. The hydraulic tensioner according to claim 18 wherein hydraulic tensioner pressure caused by engine load on the linking element causes hydraulic pressure in the first chamber to be substantially higher than hydraulic pressure in the fluid chamber.

20. The hydraulic tensioner according to claim 19 wherein when fluid flows from the fluid chamber to the first chamber, flow through the main chamber proceeds substantially directly from the second passage to the first passage and when fluid flows from the first chamber to the fluid chamber, flow through the main chamber proceeds from the first passage around the main chamber in a vortex and then toward the center of the main chamber to the second passage.

* * * * *